United States Patent
Pate

(10) Patent No.: US 10,946,770 B1
(45) Date of Patent: Mar. 16, 2021

(54) VEHICLE SAFETY SYSTEM

(71) Applicant: Charles Pate, Live Oak, FL (US)

(72) Inventor: Charles Pate, Live Oak, FL (US)

( * ) Notice: Subject to any disclaimer, the term of this patent is extended or adjusted under 35 U.S.C. 154(b) by 0 days.

(21) Appl. No.: 16/793,042

(22) Filed: Feb. 18, 2020

(51) Int. Cl.
| | |
|---|---|
| G08B 21/22 | (2006.01) |
| B60N 2/00 | (2006.01) |
| G08B 21/02 | (2006.01) |
| G08B 21/24 | (2006.01) |
| B60N 2/26 | (2006.01) |
| B60N 2/90 | (2018.01) |

(52) U.S. Cl.
CPC ......... *B60N 2/002* (2013.01); *G08B 21/0202* (2013.01); *G08B 21/22* (2013.01); *G08B 21/24* (2013.01); *B60N 2/26* (2013.01); *B60N 2002/981* (2018.02)

(58) Field of Classification Search
CPC ............... G08B 21/02; G08B 21/0202; G08B 21/0277; G08B 21/22; G08B 21/24; B60N 2/002; B60N 2/26; B60N 2002/981; B60R 21/015; B60R 21/01556; B60R 25/31; B60R 25/102
See application file for complete search history.

(56) References Cited

U.S. PATENT DOCUMENTS

| | | | | |
|---|---|---|---|---|
| 9,741,224 | B1* | 8/2017 | Singh | G08B 21/22 |
| 10,071,654 | B2 | 9/2018 | Mclean, Jr. | |
| 10,196,036 | B2 | 2/2019 | Alderman | |
| 2010/0078978 | A1* | 4/2010 | Owens | G08B 21/0247 297/250.1 |
| 2011/0109450 | A1* | 5/2011 | Hirschfeld | B60N 2/002 340/457 |
| 2014/0253313 | A1* | 9/2014 | Schoenberg | B60N 2/28 340/457 |
| 2014/0253314 | A1* | 9/2014 | Rambadt | G08B 21/0266 340/457.1 |
| 2016/0117636 | A1* | 4/2016 | Miller | G06Q 50/30 705/332 |
| 2017/0116839 | A1* | 4/2017 | Friedman | B60N 2/26 |
| 2017/0232887 | A1* | 8/2017 | Clontz | B60N 2/002 340/457 |
| 2018/0053390 | A1* | 2/2018 | Morris | G08B 21/24 |
| 2019/0232818 | A1* | 8/2019 | Gangu | G08B 21/22 |
| 2020/0058210 | A1* | 2/2020 | Williams | G07C 5/08 |

* cited by examiner

Primary Examiner — Andrew W Bee
(74) Attorney, Agent, or Firm — Sanchelima & Associates, P.A.; Christian Sanchelima; Jesus Sanchelima

(57) ABSTRACT

A vehicle safety system including a vehicle assembly, a communication assembly and a seat assembly is disclosed. The vehicle assembly includes a vehicle having a diagnostics port and an onboard vehicle computer. The communication assembly includes a communication device that plugs into the diagnostics port. The communications assembly includes a microprocessor and a wireless communication module. The seat assembly includes a seat cushion and a weight sensor. A child is to sit on the seat cushion during transportation. Once the vehicle is shut off, the weight sensor determines if any weight above a predetermined threshold is detected. If weight is detected and the vehicle is shut off then it is assumed that the child was mistakenly left in the vehicle unattended and alerts within the vehicle, due to the onboard vehicle computer, and to a mobile device of a user, due to the microprocessor and wireless communication module, are activated.

15 Claims, 3 Drawing Sheets

VEHICLE SAFETY SYSTEM

BACKGROUND OF THE INVENTION

1. Field of the Invention

The present invention relates to a vehicle safety system and, more particularly, to a vehicle safety system that helps to prevent a child from mistakenly being left behind in an unattended vehicle thereby helping to also prevent the accidental death of the child.

2. Description of the Related Art

Several designs for vehicle safety systems have been designed in the past. None of them, however, include a vehicle safety system that uses a weight sensor in a child car seat that can communicate with an onboard vehicle computer to send a message to a mobile telephone.

Applicant believes that a related reference corresponds to U.S. Pat. No. 10,196,036 for a safety system for a vehicle that uses a pressure sensor on a vehicle seat and a mobile phone app. Applicant believes another related reference corresponds to U.S. Pat. No. 10,071,654 for an alarm system to prevent a child from being left in a vehicle which uses a weight sensor and a communication link to a cellular phone. None of these references, however, teach of a vehicle safety system that makes use of an onboard vehicle computer or a vehicle's engine control unit (ECU) and of the onboard diagnostics (OBD) to allow for the present invention to be retrofitted onto existing vehicles.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a vehicle safety system that reduces the chances of a child being mistakenly left behind in an unattended vehicle.

It is another object of this invention to provide a vehicle safety system that increases the safety of a child.

It is still another object of the present invention to provide a vehicle safety system that can be retrofitted onto existing vehicles.

It is another object of the present invention to provide a vehicle safety system that can communicate with mobile devices to alert a caregiver or parent of a child being mistakenly left unattended in a vehicle.

It is still another object of the present invention to provide a vehicle safety system that cooperates with a vehicle's onboard computer.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
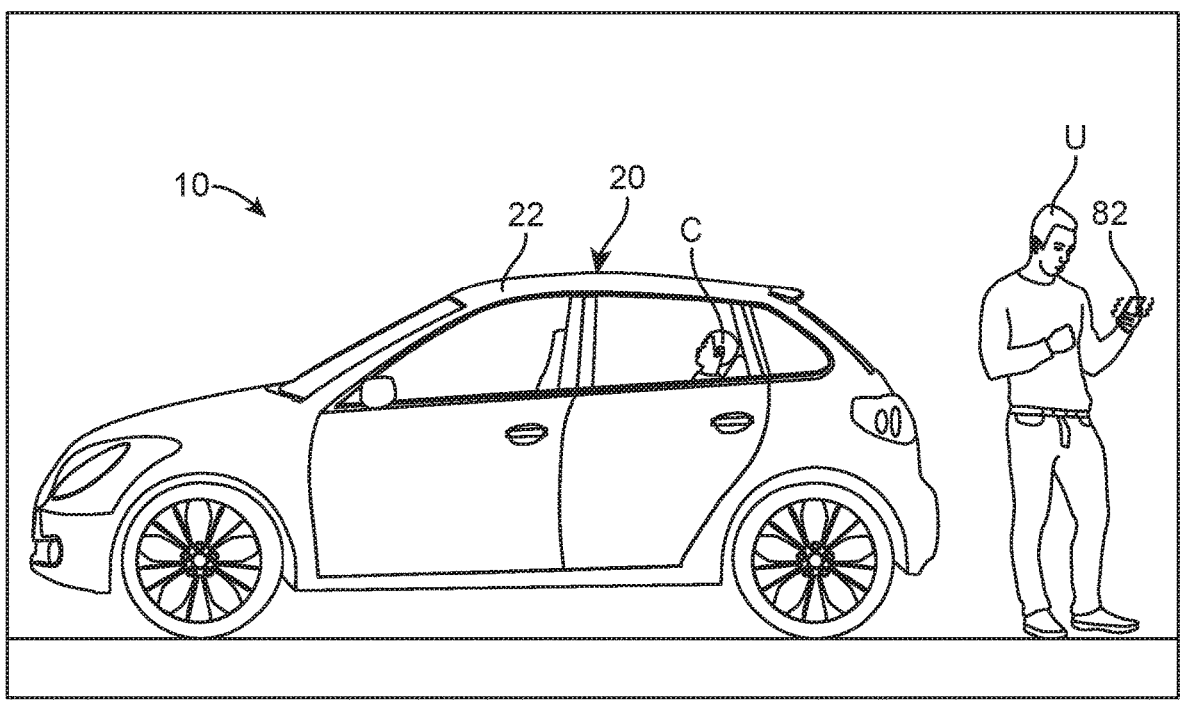
FIG. 1 represents the present invention in an operational setting in which a child has been mistakenly left in a vehicle and a caregiver has been notified of the dangerous situation.
Figure 2:
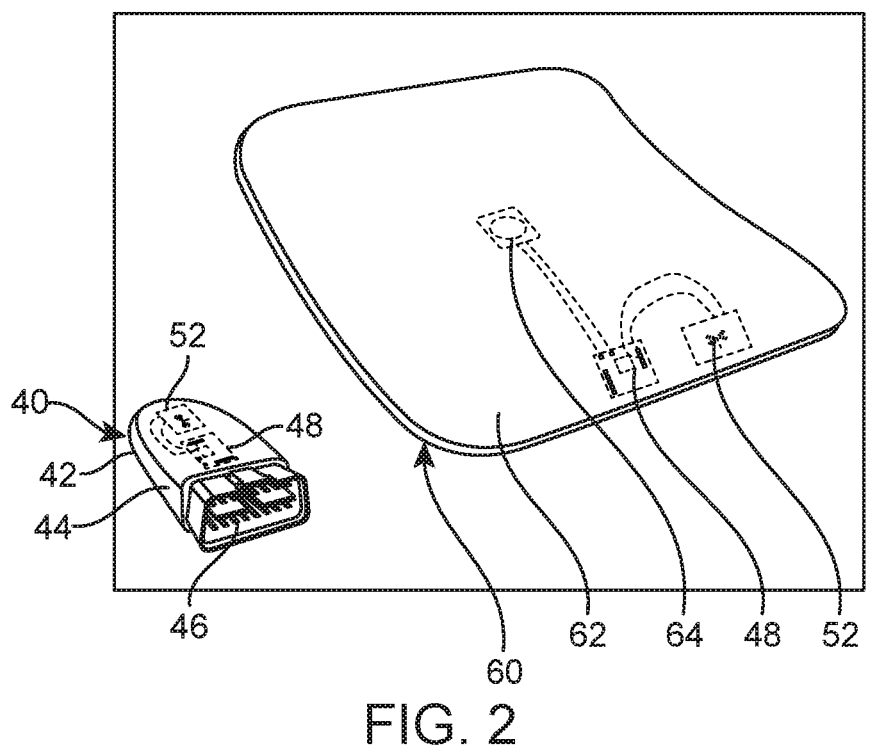
FIG. 2 shows an isometric view of the present invention.

Referring now to the drawings, where the present invention is generally referred to with numeral 10, it can be observed that it, a vehicle safety system, basically includes a vehicle assembly 20, a communication assembly 40 and a seat assembly 60.

The present invention is depicted in an operational setting as seen in FIG. 1. It can be seen that the present invention helps to increase the safety of a child C by reducing the chances that child C gets mistakenly left behind in a car. This is a situation that may potentially be fatal to the child and as such it may be desired to prevent.

The present invention includes vehicle assembly 20. Vehicle assembly 20 may include a vehicle 22. Vehicle 22 may be one of any preexisting vehicles. Importantly, vehicle 22 may include an onboard vehicle computer 24 which may permit for wireless communication to occur to allow a user U to be alerted about situations occurring within vehicle 22 that may be dangerous or potentially fatal. Importantly, vehicle 22 may include a diagnostics port 26 which may allow for communication assembly 40 to be mounted thereto. Diagnostics port 26 may be the port used to connect onboard diagnostic tools as known in the art. In one embodiment, vehicle 22 may include a display device, which may be used for alerts or alarms in a visual manner. Vehicle 22 may also include speakers for audio alerts or alarms. Additionally, vehicle 22 may include vehicle seats 28 for sitting or placing objects thereon.

Figure 3:
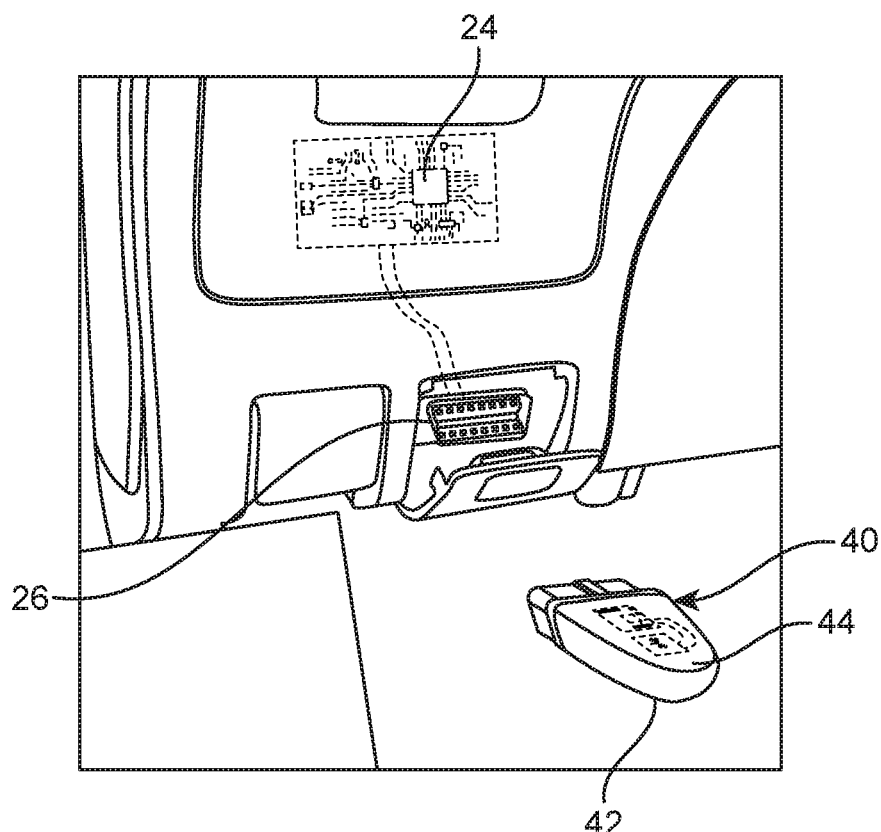
FIG. 3 illustrates how the communication assembly is mounted to a vehicle.

Vehicle safety system 10 may further include communication assembly 40. Communication assembly 40 may include a communication device 42. As seen in FIG. 3, communication device 42 may be connected or plugged to diagnostics port 26. Communication device 42 may include a housing 44. In one embodiment, housing 44 may preferably be made of plastic. In one embodiment, housing 44 may be semicircular. However, it should be understood that it might be suitable for housing to be virtually any other shape. It may be suitable for housing 44 to be of predetermined dimensions that cooperate with fitting within vehicle 22 and attaching to diagnostics port 26. On one side of housing 44 may be vehicle connectors 46 which may extend from housing 44. Vehicle connectors 46 allow for communication device 42 to be mounted inside of vehicle 22 to diagnostics port 26. Vehicle connectors 46 cooperate with and plug into diagnostics port 26. Inside of housing 44 may be a microprocessor 48 and a wireless communications module 52. Microprocessor 48 and wireless communications module 52 may allow for the present invention to communicate with a mobile device 82 of user U. Once the present invention detects that child C has been left unattended in vehicle 22 microprocessor 48 may use wireless communication module 52 to communicate with mobile device 82 in the form of a phone call, text message, mobile device notification, mobile application alert, an alarm or combinations thereof. Wireless communication module 52 may allow for communication to occur through Bluetooth, Wi-Fi, RFID, 2G, 4G, 5G, mobile data or the like as known in the art with mobile device 82.

Figure 4:
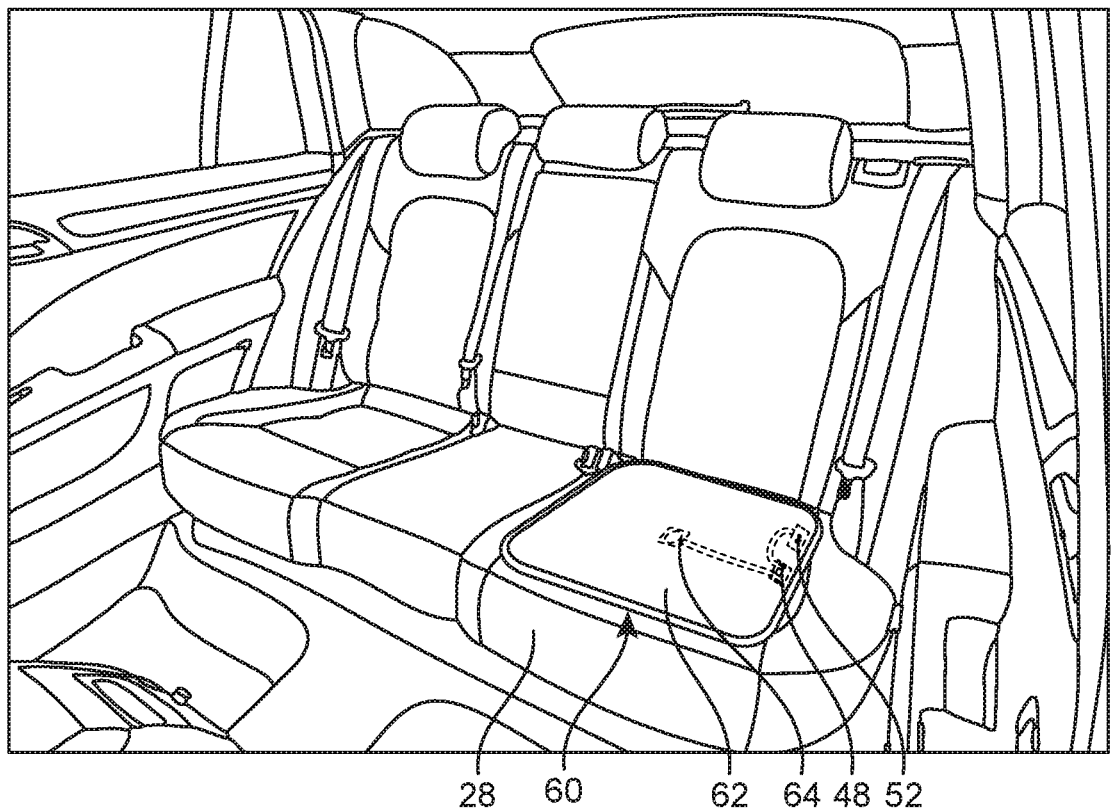
FIG. 4 is a representation of the seat assembly being mounted to a vehicle.

Vehicle safety system 10 may further include seat assembly 60. As seen in FIG. 4, seat assembly 60 may preferably be mounted inside of vehicle 22 where child C is intended to sit. Seat assembly 60 may include a seat cushion 62. Seat cushion 62 may be where child C sits while in vehicle 22. In one embodiment, seat cushion 62 may have a rectangular shape. However, it should be understood that seat cushion 62 may be any predetermined shape of predetermined dimensions. It should be understood that seat cushion 62 may be made of a material that is comfortable to sit upon for prolonged periods of time. Seat cushion 62 may be made of cotton, foam, rubber, latex, memory foam, feathers, bamboo, polyester, torn material or other suitable materials. Seat cushion 62 may be placed on one of vehicle seats 28 where it is suitable for child C to be seated within vehicle 22. This may be on vehicle seats 28 at the front or rear of vehicle 22. Importantly, within seat cushion 22 may be a weight sensor 64. Inside of seat cushion 62 may be a microprocessor 48 having wireless communication module 52. This allows for data from weight sensor 64 to be communicated to user U wirelessly as well as for alerts and alarms to be triggered when needed. It may also be suitable for weight sensor 64 to be on a top surface or bottom surface of seat cushion 62. Weight sensor 64 may be adapted to detect if there is any weight on seat cushion 62. Weight sensor 64 may detect if child C is sitting on seat cushion 62. Weight sensor 64 may be set to have a predetermined threshold to determine when an alert is necessary. It may be necessary to shut vehicle 22 off before weight sensor 64 determines if child C is still within vehicle 22. Once vehicle 22 is shut down, if weight sensor 64 detects weight above the predetermined threshold then alerts or alarms may go off within vehicle 22 and may additionally be sent to user U, whom may be the caregiver of child C. The alerts and alarms may be possible due to vehicle assembly 20 and communication assembly 40. If vehicle 22 is shut off and weight sensor 64 detects weigh below the predetermined threshold then no alerts or alarms are necessary and it is assumed child C has not been left unattended within vehicle 22. In one embodiment, the present invention may activate necessary alerts or alarms after a predetermined time has lapsed since vehicle 22 has been turned off and child C is determined to be on seat cushion 62 by weight sensor 64. This allows for the safety of child C to increase and thereby reducing the chance of accidental death of child C. Communication device 42 and seat cushion 62 may be portable. It should be understood that the present invention may be retrofitted onto any vehicles having diagnostics port 26 typically used of onboard diagnostic tools to be plugged into. It can be appreciated that alerts and alarms generated by the present invention may be visual or audio or combinations thereof.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A vehicle safety system, comprising:
   a. a vehicle assembly including a vehicle having an onboard vehicle computer and a diagnostics port;
   b. a communications assembly including a communication device mounted to said diagnostics port, said communication device including a housing partially received within said diagnostics port, said housing includes an open face to engage said diagnostics port;
   c. a seat assembly having a seat cushion and a weight sensor within said seat cushion, said seat cushion being flat, said weight sensor being centrally located within said seat cushion, said weight sensor detects when a weight above a predetermined threshold is detected on said seat cushion when said vehicle is turned off, when said weight above said threshold is detected, alerts and alarms are generated; and
   d. said alerts and said alarms are generated within said vehicle by said onboard vehicle computer, said alerts and said alarms are generated on a mobile device of a user by said communication device, said mobile device being away from said vehicle.

2. The system of claim 1, wherein said alerts and said alarms within said vehicle are audio, visual or combinations thereof.

3. The system of claim 1, wherein said vehicle includes vehicle seats for said seat cushion to be mounted thereon, said vehicle seats including a sitting portion, said seat cushion being parallel to said sitting portion when secured to said vehicle seats.

4. The system of claim 1, wherein said housing being semi circular, said housing including a rear portion protruding from said diagnostic port and facilitating inserting or removing of said housing from said diagnostics port.

5. The system of claim 1, wherein said mobile device, said seat cushion and said communication device communicate wirelessly with a wireless communication module.

6. The system of claim 5, wherein said wireless communication module is capable of Bluetooth, Wi-Fi, RFID, 2G, 4G, 5G, or mobile data communication.

7. The system of claim 1, wherein said weight sensor waits a predetermined amount of time after said vehicle has been shut off before detecting said weight.

8. The system of claim 1, wherein said seat cushion and said communication device are portable and removable from said vehicle.

9. The system of claim 1, wherein said seat cushion and said communication device are retrofitted onto existing vehicles.

10. A vehicle safety system, consisting of:
   a. a vehicle assembly including a vehicle having an onboard vehicle computer and a diagnostics port;
   b. a communications assembly including a communication device mounted to said diagnostics port, said communication device having a housing including vehicle connectors within at a front side thereof, said housing including an open front face, said vehicle connectors being visible through said open front face, said vehicle connector engaging said diagnostics port, said housing partially protruding from said diagnostics port, said housing having a microprocessor and a wireless communication module, said vehicle connectors being parallel to each other;
   c. a seat assembly having a seat cushion and a weight sensor within said seat cushion, said seat cushion being flat, said weight sensor being centrally located within said seat cushion, said weight sensor detects when a weight above a predetermined threshold is detected on said seat cushion when said vehicle has been shut off for a predetermined length of time, when said weight above said threshold is detected, alerts and alarms are generated, said seat cushion further including a microprocessor and a wireless communication module, said communication device and said seat cushion communicate via said microprocessors and said wireless communication modules, said microprocessor and said wireless communication within said seat cushion being located about a lateral edge of said seat cushion and adjacent to each other; and d. said alerts and said alarms are generated within said vehicle by said onboard vehicle computer, said alerts and said alarms are generated on a mobile device of a user by said communication device, said mobile device being away from said vehicle.

11. The system of claim 1, wherein said seat cushion includes a border extending entirely about a perimeter thereof.

12. The system of claim 1, wherein said seat cushion includes rounded corners.

13. The system of claim 1, wherein said communication device includes vehicle connectors, said vehicle connectors being within said communication device, said vehicle connectors being visible through said open face, said vehicle connectors engaging said diagnostics port.

14. The system of claim 1, wherein said communication device is secured entirely below said onboard vehicle computer.

15. The system of claim 5, wherein said seat cushion includes a microprocessor within, said microprocessor and said wireless communication module within said seat cushion being adjacent to each other along a lateral edge of said seat cushion.

* * * * *